UNITED STATES PATENT OFFICE.

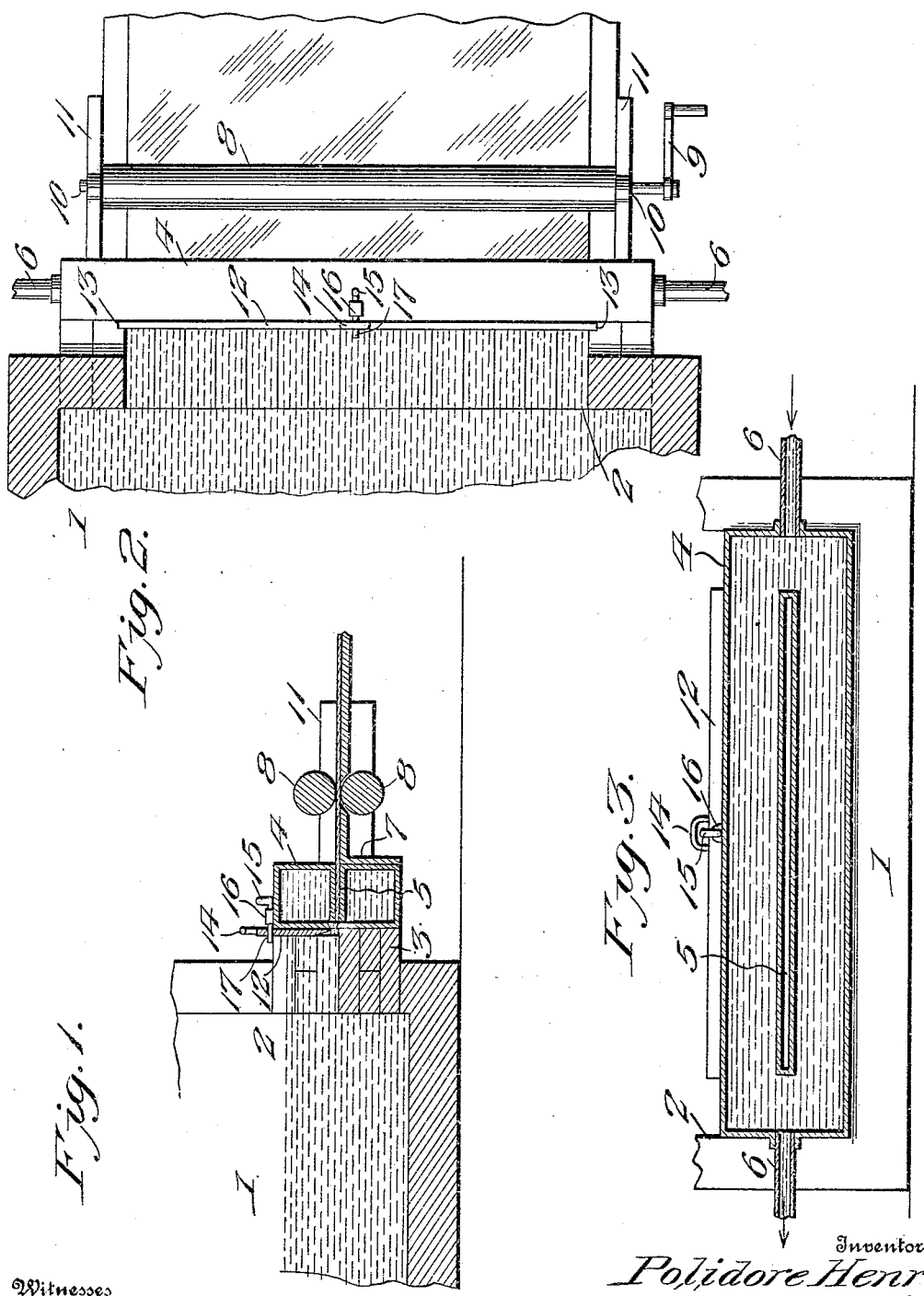

POLIDORE HENRY, OF SPRING CITY, PENNSYLVANIA.

GLASS-MAKING MACHINE.

955,066.  Specification of Letters Patent.  Patented Apr. 12, 1910.

Application filed June 13, 1907. Serial No. 378,833.

*To all whom it may concern:*

Be it known that I, POLIDORE HENRY, a citizen of the United States of America, residing at Spring City, in the county of Chester and State of Pennsylvania, have invented new and useful Improvements in Glass-Making Machines, of which the following is a specification.

This invention relates to improvements in glass making machines adapted for making sheet or window glass and also adapted for making other forms of glassware, and the same comprises, in combination with a glass-melting tank, a forming element for the glass discharged from such tank, such forming element constructed for the circulation of a cooling medium therein so that the glass discharged from the tank is simultaneously formed and cooled, as hereinafter more fully described and pointed out in the claim.

In the accompanying drawings,—Figure 1 is a sectional view of a portion of a glass making machine constructed in accordance with my invention. Fig. 2 is a top plan view of the same partly in section on a horizontal plane intersecting the walls of the tank. Fig. 3 is a vertical sectional view of the same on a plane intersecting the forming and cooling box or element.

The glass melting tank 1 may be of the form here shown or of any other suitable construction. The same is shown as provided at the opening 2 therein from which molten glass is discharged therefrom with a projecting ledge or gateway 3 which may be constructed of fire brick or of other suitable refractory material. A box or forming and cooling element 4 is secured at one side of the tank against the discharge opening thereof and is provided with an opening 5 which extends transversely therethrough nearly from end to end thereof and which corresponds in length and width with the required thickness of the glass sheets to be produced by the machine. By varying the shape of the opening 5 articles of various shapes may be produced, as will be understood. The opening 5 serves to form or shape the glass as the same flows therethrough from the tank. The said forming element 4 is also a cooling element for cooling the glass as it passes through the opening 5 and is formed thereby. Such cooling element is here shown as a box provided with a chamber which surrounds the opening 5 and to which pipes 6 are connected to permit water or other suitable cooling medium to be caused to circulate through such forming and cooling element around the walls forming the opening 5 so that the glass as it passes through the opening 5 is simultaneously formed and cooled. On the outside of such cooling and forming element is a table 7 on which the glass sheet or other article moves as the same passes through the opening 5 and above and below such table are a pair of drawing rolls 8 which respectively engage the upper and lower sides of the glass sheet or other article and serve to compress such sheet while it is still plastic so as to reduce it to a uniform thickness and also serve to cause such sheet to move over the table 7. Any suitable means may be employed to rotate such rolls, but for the purposes of this specification I show one of such rolls provided with an operating crank 9. Such rolls are shown as having their bearings at 10 in the side ledges 11 at the inner end of the table.

I also provide means for cutting the glass sheet or other article formed by the machine. Such cutting means is here shown as a knife or blade 12 which is mounted on the inside of the forming and cooling box or element, with its vertical ends operating in vertical grooves 13 in opposite sides of the gateway or discharge opening 2 of the glass melting tank. Such blade is provided on its upper side at its center with a loop 14 for engagement by means to raise such knife or cutter and the latter when raised, so as to uncover the inner side of the opening 5 and permit molten glass to flow through such opening and become formed and cooled therein, may be supported in such raised position by a bolt 15 which is mounted on the box 4, as at 16, and is adapted to be inserted in an opening 17 with which such cutter is provided. It will be understood that by first removing such bolt from such cutter the latter may be forced downwardly through the glass at the inner side of the forming and cooling opening 5 to cut the glass at such point and hence enable glass sheets or other articles of any desired length to be produced.

Having thus described the invention, what is claimed as new, is:—

A glass melting tank having a discharge opening and a projecting flange forming a gate-way at one side of said tank, a forming and cooling box disposed on the outer side of said gate-way having its lower portion bearing against the same and its upper portion forming a part of a wall of said tank, said cooling and forming box having internal walls forming a forming opening through said box, said opening terminating short of the ends of the box so that the contents of the box entirely surround said opening, means to maintain a circulation of cooling fluid through said box and a blade forming a gate and a cutter, said blade being disposed and movable vertically on the side of said box exposed to the tank and thereby adapted to open or close the forming opening, said blade having a sharpened lower edge, and means to secure said blade in opened position.

In testimony whereof, I affix my signature in presence of two witnesses.

POLIDORE HENRY.

Witnesses:
 HARRY E. THOMAS,
 GEORGE W. ROOT.